United States Patent Office 2,852,429
Patented Sept. 16, 1958

2,852,429

ANTIBIOTIC SALTS AND PREPARATION THEREOF

John T. Shepler, Indianapolis, Ind., assignor to Eli Lilly and Company, Indianapolis, Ind., a corporation of Indiana No Drawing. Application August 3, 1953
Serial No. 372,207

5 Claims. (Cl. 167—65)

This invention relates to novel antibiotic salts and more particularly to the d-gluconic and d-glucoheptonic acid addition salts of erythromycin and carbomycin, and to their preparation.

Erythromycin and carbomycin are antibiotic agents characterized by broad antibacterial spectra, and are used extensively in medicine.

Hitherto those antibiotics have been used only for oral administration inasmuch as suitable soluble acid addition salts for intravenous administration have not been available. Although oral administration is satisfactory in most cases, there are instances in which parenteral administration of the drugs is indicated, as for example the administration to moribund patients and patients who are for some reason or other unable to ingest any medicament.

Erythromycin and carbomycin in their basic forms are too insoluble for the preparation of parenterally administrable solutions. Acid addition salts of the antibiotics prepared with the commony employed acids such as those disclosed in U. S. patent application Serial No. 282,246, filed April 14, 1952, now Patent No. 2,653,899, are either too insoluble in water to be satisfactory or are so acidic in their properties that the relatively low pH of their aqueous solutions causes a rapid loss in potency of the acid-labile antibiotics.

I have found that the d-gluconic and d-glucoheptonic acid addition salts of the antibiotics avoid the foregoing disadvantages. My new salts form aqueous solutions which are substantially neutral. The aqueous solutions are sufficiently stable so they can be maintained at room temperature for a period of several weeks without appreciable loss in potency, and under refrigeration conditons can be maintained for much longer periods of time. Moreover, the salts are quickly soluble in water, and solutions of the salts when injected intravenously are well tolerated and do not cause pain or provoke other undesirable side effects.

The novel salts of this invention are readily prepared by the reaction of about stoichiometric amounts of the antibiotic and the acid in an inert solvent solution. Preferably a slight excess of the antibiotic base is employed to insure complete neutralization of the acid and so avoid excess acid in the final product. The antibiotic salt can be isolated from the reaction mixture by evaporation or by precipitation procedures in which there is added to the antibiotic salt solution a solvent in which the salt is relatively insoluble so that the salt is preferentially precipitated and any excess of antibiotic base remains in solution. Alternatively, the salts can be prepared by reacting stoichiometric equivalents of the antibiotic base and the acid in aqueous solution, and evaporating the solution to dryness in vacuo, or by freeze-drying the solution, and washing out of the material any excess of antibiotic base.

For the preparation of the salts, I have found it desirable to start with the lactones of gluconic or glucoheptonic acids, and to hydrolyze the lactones to the acids. By so doing, a purer form of the acid can generally be obtained, and the resulting salt will accordingly be purer.

Solutions of the antibiotic salts suitable for therapeutic administration are prepared by dissolving the salt in sterile water or saline solution in the desired concentration. Inasmuch as the salts are quite soluble in water, concentrations upwards of 10 percent can be obtained should such concentrated solutions be desired. In addition to solutions made up with water or saline solution, there can also be employed other aqueous solutions, e. g., aqueous propylene glycol solutions or buffer solutions, Other suitable parenterally administrable vehicles will readily suggest themselves to those skilled in the art.

By way of illustration, a pharmaceutical preparation of erythromycin d-glucoheptonate suitable for intravenous injection is obtained as follows:

500 sterile glass ampoules are each filled with 385 mg. of erythromycin d-glucoheptonate assaying about 707 erythromycin units per mg.

Prior to use the erythromycin d-glucoheptonate in an ampoule is dissolved by adding to the ampoule 10 ml. of sterile distilled water. Each ml. of the solution contains 25,000 mcg. of erythromycin in the form of its d-glucoheptonate salt. The solution has a pH of about 7–7.5 and is suitable for intravenous injection. The solution can be kept for several weeks at room temperature without appreciable loss of potency, and can be kept at refrigerated temperature for a period of about two months of more without serious loss of potency.

This invention is further illustrated by the following example:

Example 1

A solution of 10 g. of d-glucoheptonic acid lactone in 50 ml. of distilled water is warmed on a steam bath for about 2 hours to hydrolyze the lactone to the acid. The mixture is cooled, and 100 ml. of 95 percent ethanol are added. To the solution of glucoheptonic acid are added about 37 g. of erythromycin, and the volume of the reaction mixture is brought to 200 ml. by the addition of 95 percent ethanol. The reaction mixture is stirred for about 2 hours, and is filtered through a porcelain filter candle of porosity 02. To provide a sterile product, aseptic technique is used throughout the remainder of the procedure. To the filtered solution are added slowly and with stirring about 1200 ml. of anhydrous ether, to cause precipitation of erythromycin d-glucoheptonate and to keep in solution any excess of unreacted erythromycin. The precipitated erythromycin salt is removed by filtration through a sintered glass funnel, is washed with anhydrous ether, and is dried in vacuo.

Erythromycin d-glucoheptonate melts over a range of about 95–140° C. The antibiotic potency of the erythromycin d-glucoheptonate prepared in accordance with the above, as determined by microbiological assay using *Staphylococcus aureus* as a test organism is about 750 mcg. of erythromycin activity per mg.

Erythromycin d-glucoheptonate is soluble in water, dioxane, acetone, propylene glycol and the water-soluble alcohols, and is relatively insoluble in ethyl ether, chloroform, toluene, benzene and ethylene dichloride.

*Analysis.*—Calculated for $C_{44}H_{85}O_{21}N$: C, 54.81; H, 8.889; N, 1.453. Found: C, 54.70; H, 9.18; N, 1.47.

The d-glucoheptonate salt of carbomycin is prepared in a manner similar to that described above using the same amounts of material except that about 43 g. of carbomycin are employed, and the reaction mixture is diluted to about 300 ml. with 95 percent ethanol to provide for the decreased solubility of carbomycin d-glucoheptonate in ethanol-water mixture.

Example 2

10 g. of glucono-d-lactone are dissolved in 50 ml. of water and warmed on a steam bath for about two hours to hydrolyze the lactone to d-gluconic acid. The solution is cooled and 150 ml. of 95 percent ethanol are added. 44 g. of erythromycin are dissolved in the solution with stirring, and the volume of the solution is brought to about 200 ml. by the addition of 95 percent ethanol. The solution is stirred for about 2 hours, and is sterilized by filtration through a 02 porcelain filter. To the filtered solution are added with sterile technique 1200 ml. of anhydrous ethyl ether to cause precipitation of the erythromycin d-gluconate. The salt is filtered under sterile conditions on a sintered glass filter and the solid material is washed several times with anhydrous ethyl ether to wash out any free erythromycin base in the solid material. The erythromycin d-gluconate is dried in vacuo.

Erythromycin d-gluconate is a white, crystalline material which is soluble in water, dioxane, acetone, propylene glycol and the lower alcohols. It is relatively insoluble in ethyl ether, chloroform and the hydrocarbon solvents. It melts indefinitely over a range of about 110° to 130° C.

Carbomycin d-gluconate is prepared by substantially the same procedure using the amounts described above except that about 50 g. of carbomycin are employed and the volume of alcohol employed is about 300 ml. instead of 150 ml., to provide for the decreased solubility of carbomycin d-gluconate.

I claim:

1. A member of the group consisting of erythromycin d-gluconate, erythromycin d-glucoheptonate, carbomycin d-gluconate, and carbomycin d-glucoheptonate.

2. Erythromycin d-gluconate.
3. Erythromycin d-glucoheptonate.
4. Carbomycin d-gluconate.
5. Carbomycin d-glucoheptonate.

References Cited in the file of this patent

UNITED STATES PATENTS

| | | |
|---|---|---|
| 2,211,630 | Stuart | Aug. 13, 1940 |
| 2,481,267 | Falti | Sept. 6, 1949 |
| 2,516,080 | Sobin | July 18, 1950 |
| 2,560,891 | Regna | July 17, 1951 |
| 2,583,534 | Mast | Jan. 29, 1952 |
| 2,653,899 | Bunch et al. | Sept. 29, 1953 |
| 2,673,855 | Nager | Mar. 30, 1954 |
| 2,761,859 | Hoffhine | Sept. 4, 1956 |
| 2,785,104 | Tanner | Mar. 12, 1957 |

FOREIGN PATENTS

| | | |
|---|---|---|
| 1,015,116 | France | Aug. 27, 1952 |
| 1,031,467 | France | June 24, 1953 |

OTHER REFERENCES

Tanner et al.: "Some Properties of Magnamycin," Antibiotics and Chemotherapy, September 1952, pp. 441–443.

Stone: "The Gluconates," Drug and Cos. Ind., August 1950, pp. 192–193.